United States Patent [19]

Buxel et al.

[11] Patent Number: 5,053,210

[45] Date of Patent: Oct. 1, 1991

[54] METHOD FOR THE PURIFICATION OF FLUE GASES

[75] Inventors: Michael Buxel, Waltrop; Friedrich-Wilhelm Pietzarka; Horst Thieme, both of Dortmund; Manfred Koch, Holzwickede, all of Fed. Rep. of Germany

[73] Assignee: UHDE GmbH, Dortmund, Fed. Rep. of Germany

[21] Appl. No.: 227,393

[22] Filed: Oct. 6, 1988

Related U.S. Application Data

[63] Continuation of Ser. No. 13,893, Feb. 11, 1987, abandoned.

[30] Foreign Application Priority Data

Feb. 11, 1986 [DE] Fed. Rep. of Germany ....... 3604204

[51] Int. Cl.$^5$ ........................ B01J 8/00; C01B 17/00; C01B 21/00
[52] U.S. Cl. .................................... 423/239; 423/242; 423/244
[58] Field of Search ............... 423/242 A, 242 R, 239, 423/244 A, 244 R

[56] References Cited

U.S. PATENT DOCUMENTS

| | | | |
|---|---|---|---|
| 4,272,497 | 6/1981 | Takahashi et al. | 423/239 |
| 4,400,363 | 8/1983 | Grochowski et al. | 423/239 |
| 4,500,501 | 2/1985 | Hamada et al. | 423/239 |

Primary Examiner—Gregory A. Heller
Attorney, Agent, or Firm—Marshall & Melhorn

[57] ABSTRACT

A process and an apparatus for the purification of gases, particularly for the desulphurization of and $NO_x$-elimination from flue gas by multistage adsorption and catalytic reaction in gravity-flow moving beds of granular, carbon-bearing materials contacted by a transverse steam of the gas, in which a minimum of two moving beds are arranged in series with reference to the gas route so that $NO_x$-elimination takes place in the second or any downstream moving bed. Where large volumes of flue gas from industrial furnaces must be purified, purification is adversely affected by the formation of gas streaks with widely varying sulphur dioxide concentrations. This disadvantage is eliminated in that the prepurified flue gas leaving the first moving bed and having a locally variable sulphur dioxide concentration gradient is subjected to repeated mixing before ammonia is added as reactant for $NO_x$-elimination.

4 Claims, 2 Drawing Sheets

METHOD FOR THE PURIFICATION OF FLUE GASES

This application is a continuation of application Ser. No. 07/013,893, filed Feb. 11, 1987, abandoned.

BACKGROUND OF THE INVENTION

The invention relates to a process and plant for the purification of gases, particularly for the desulphurization of and $NO_x$-removal from flue gases by multistage adsorption and catalytic reduction in gravity-flow moving beds of granular, carbon-bearing materials contacted by a transverse stream of the gas, a minimum of two such moving beds being arranged in series with reference to the gas route so that $NO_x$-elimination takes place in the second or any downstream moving bed.

Referring to the state of the art, it is known from West German Patent DE-OS 2911712 to separate gaseous and solid pollutants from gas streams by adsorption and/or adhesion in gravity-flow moving beds of granular, carbon-bearing material, especially activated coke or activated carbon, in that a transverse flow of the gas stream to be purified passes through these moving beds. Referring to West German Patent DE-OS 3232546, it is also known to arrange several moving beds in series with reference to the direction of flow of the gas to be purified and to provide for an additional feature in that the various moving beds may be interconnected with the gas and solids routes to reflect a quasi counter-current principle. The state of the art further teaches that purification steps may be allocated in a substance-related pattern to various moving beds arranged in series. Elimination of nitrogen oxides is performed in a known way with ammonia serving as a reducing agent. This method depends on diluted or undiluted gaseous ammonia or an aqueous ammonia solution being injected into the inlet duct of the first moving bed or into the outlet duct of the first moving bed or the inlet duct of the second moving bed or even directly into the moving beds, for example see West German Patents DE-OS 3232544, DE-0S 3039477, and DE-OS 2911712.

Chemical properties governing the $NO_x$-elimination step prevent selective reaction with $NO_x$ of the ammonia injected into the flue gas stream to be purified. Secondary reactions take place with the other flue gas constituents, for example $SO_2$, hydrochloric acid, hydrofluoric acid, and oxygen, in addition to the desired reaction. Therefore, referring to the state of the art, according to West German Patent DE-OS 2911712, the more-recent processes and plants use the first moving bed for removing from the gas stream the major portion of sulphur dioxide, for example, while the elimination of nitrogen oxides is performed in a second moving bed after injection of ammonia. According to the state of the art, this method cuts ammonia requirements at comparable $NO_x$-elimination rates. In addition, the formation of ammonium salt deposits on the granular, carbon-bearing material of the moving bed is lowered.

Despite said improvements, the processes and plants incorporating the state of the art still have a serious disadvantage. Large volumes of gas, such as flue gas emissions from industrial furnaces, require the fabrication, installation and operation of large items of equipment. At the same time, consideration must be given to the economical use of energy and raw materials since the process requires large volumes of adsorption agent to be moved. It is common practice to allow the loading of the adsorption agent to a point where the risk of a breakthrough of sulphur dioxide exists over a wide range in the lower part of the first moving bed. Consequently, concentrations of sulphur dioxide are bound to increase from top to bottom on the outlet side of the first moving bed. The stream in the outlet duct of the first moving bed is subject to the formation of gas streaks with comparatively high concentrations of sulphur dioxide. A significant portion of the ammonia injected for the reaction of $NO_x$-elimination downstream of the outlet duct of the first moving bed will be consumed by side reactions in the gas streaks of high $SO_2$ concentration and is, therefore, lost for the reaction of $NO_x$-elimination. In the upper part of the second moving bed, the catalytic reaction of $NO_x$-elimination takes place in line with design conditions while such reaction can be reduced to zero by side reactions in the lower part. Therefore, excess ammonia must be added to achieve a certain mean degree of $NO_x$-elimination. However, the addition of excess ammonia must be limited because excess ammonia might break through in the upper part of the second moving bed and itself pollute the purified flue gas.

Referring to the suggestions outlined in West German Patent DE-OS 3232543, the plant may operate with a high excess of ammonia and a corresponding ammonia breakthrough if provision is made for a third moving bed arranged, with reference to the gas flow, downstream of the second moving bed to eliminate ammonia from the flue gas by neutralization yielding ammonium sulphate and ammonium bisulphate. According to the suggestions outlined in said publication, this is achieved by admitting to the third moving bed at least part of the granular, carbon-bearing material laden with sulphur dioxide and sulphuric acid, respectively. However, this measure entails a dramatic rise in the overall pressure drop across the plant and, consequently, a dramatic rise in energy requirements while a substantial portion of the ammonia intended for the reaction of $NO_x$-elimination is lost owing to side reactions.

Referring to West German Patent DE-OS 3014934 A1, it is suggested that the predesulphurized flue gas be admixed with a higher quantity of ammonia in the lower part than in the upper part of the second moving bed. This method may substantially avoid a local admission of excess ammonia, but the formation of significant amounts of ammonium sulphate in the lower part of the second moving bed remains a characteristic feature. In addition, a locally variable admixture of ammonia cannot be achieved at reasonable expense because the advent and the local extent of a sulphur dioxide breakthrough as well as the $SO_2$ concentrations involved are not steady-state phenomena but are subject to continuous variation depending on variations of the initial sulphur dioxide concentration and of the firing rate of the furnace.

For reasons of flow kinetics, to avoid, for example, the entrainment of particulate matter from the moving bed on the discharge side, the gas flow velocity across the discharge surface must not exceed a certain definite limit. This limit depends, for example, on the kind of the granular, carbon-bearing material of the moving bed, on the angular position of the proposed louver-type sheets which form the gas-permeable wall on the inlet and outlet sides of the moving bed housing, etc. Therefore, the size of the inlet surface is invariable. The only variable is the bed depth that is likely to prevent an $SO_2$ breakthrough. This, in turn, means a higher pressure drop across the plant as the bed depth is increased.

Without increasing the depth of the first moving bed, i.e. without additional pressure drop across the plant, a breakthrough of sulphur dioxide in the lower part of the first moving bed could also be avoided by increasing the traveling speed of the first moving bed. However, this will entail a markedly higher mechanical loss of granular, carbon-bearing adsorption agent which must be manufactured by a process that is expensive from the standpoint of both energy and raw materials.

Moreover, streaks of sulphur dioxide with the inevitable formation of ammonium salt deposits on the granular, carbon-bearing material of the second moving bed, i.e. the $NO_x$-elimination stage, may adversely affect the known processes by creating flow disturbances in a specific part of the second moving bed. These disturbances are due to the presence of ammonium sulphate which causes the formation of conglomerations of adsorption agent granules and/or of incrustations on the housing wall. This is of major importance for operational reliability because, in areas of poor flow, it affects significantly the dynamic heat balance between the heat composed of heat of adsorption, dilution and reaction in the moving bed on the one hand and the quantity of heat that is dissipated as sensible heat by the temperature rise of the effluent gas (directly proportional to the quantity of gas) on the other hand. The result may be what is called a hot spot which might impose a shut-down of the entire plant.

For the elimination of nitrogen oxides from low-oxygen waste gas, West German Patent DE-OS 2635652 describes a process which uses, at temperatures ranging from 400 to 600 degrees centigrade, a special granular, carbon-bearing material with metal oxide ingredients to serve as adsorption agent and catalyst. This process does not permit desulphurization of and $NO_x$-elimination from low-oxygen flue gas at temperatures ranging from 50° to 200° C.

In actual operation, the processes described in said publications as the state of the art evidence at least one, but generally several of the disadvantages outlined before.

SUMMARY OF THE INVENTION

The object of the invention is to improve the process from the standpoint of both economical use of energy and raw materials and maximization of desulphurization and $NO_x$-elimination.

The problems of the prior art are solved by the present invention. The following advantages are achieved:

1. The granular, carbon-bearing material of the second moving bed is utilized not only for the catalytic elimination of nitrogen oxides but also for the adsorptive final desulphurization of the flue gas. The bed depth and, consequently, the pressure drop across the first moving bed is minimized. Energy requirements are cut owing to the reduced pressure drop across the entire plant.

2. The uniform distribution of sulphur dioxide escaping from the first moving bed over the entire inlet surface of the second moving bed efficiently prevents excessive local formation of ammonium salts on the granular, carbon-bearing material and, consequently, the formation of conglomerations and incrustations. Owing to the proper motion of the entire passage, the ammonium sulphate is distributed over the total bed volume.

3. The entire volume of the second moving bed is available for the elimination of nitrogen oxides.

4. Any local ammonia breakthrough in the second moving bed is avoided by stoichiometric metering of the ammonia.

Another characteristic feature of the invention reflects a further development of the process with inherent advantages. It makes the process suitable for $NO_x$-elimination from flue gases which, with the aid of processes representing the state of the art, could not efficiently be freed from nitrogen oxides because of their composition and low oxygen content, for example. The admixture of gaseous and/or liquid reactants has a favorable influence on the adjustment of the nitrogen oxide reduction equilibrium and on the kinetics of equilibrium adjustment. Performance of the second bed for $NO_x$-elimination is thereby maximized without provision for greater bed depth with consequent higher pressure drop and additional energy requirements.

The problem of implementing the process according to the invention is especially well solved by the characterizing features of the apparatus according to the present invention. In particular, the solution provides for optimum performance of the process steps in a compact space-saving process chamber. The design of the plant for performing the process according to the invention permits, of course, a multitude of variations without deviating from the inventive idea of the process. The invention is exemplified in the attached Figures.

BRIEF DESCRIPTION OF THE DRAWINGS

These and other objects and advantages of the present invention will be apparent to those skilled in the art in the light of the present disclosure including the drawings, in which.

DESCRIPTION OF THE PREFERRED EMBODIMENT

Figure 1:
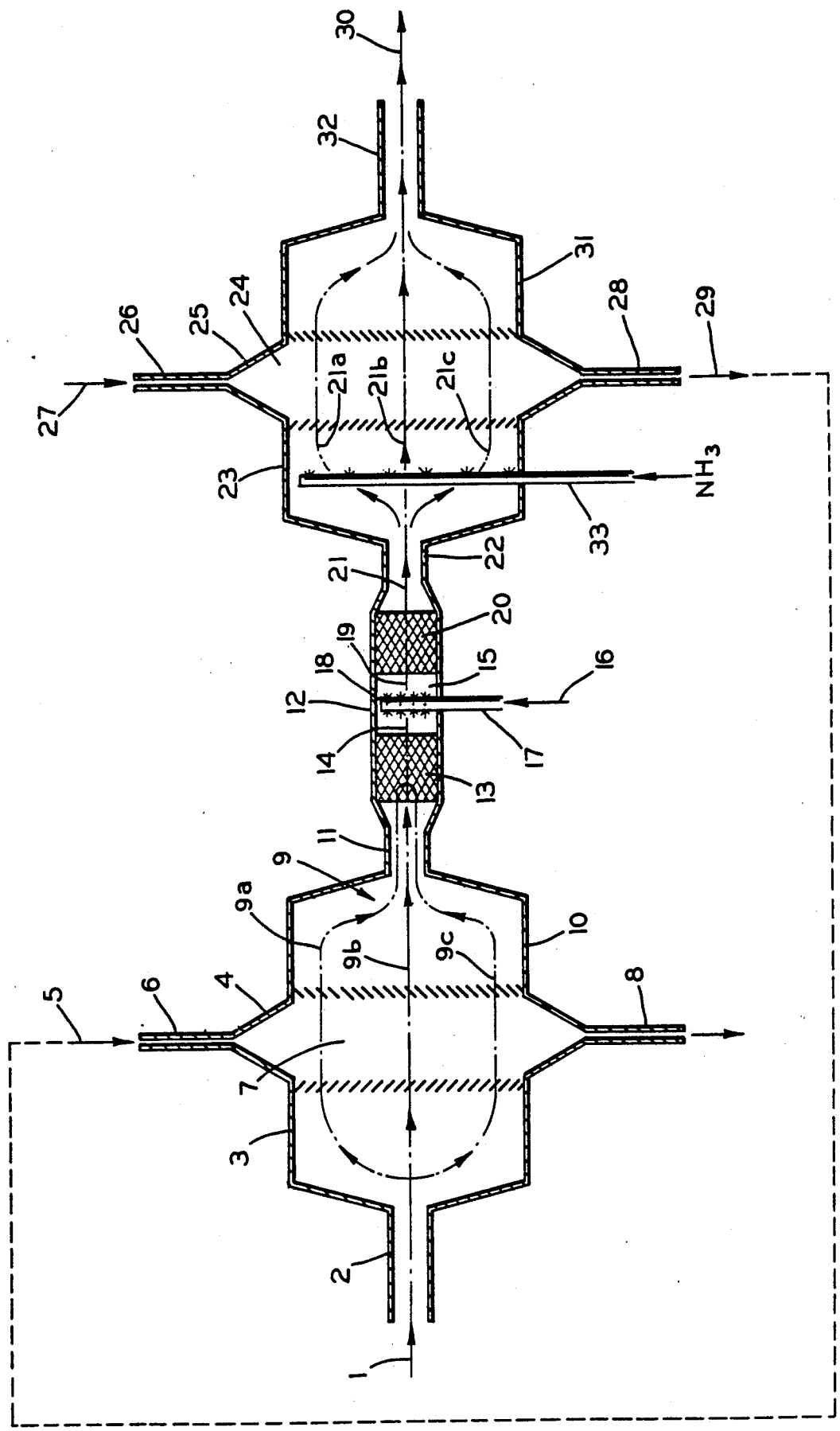
FIG. 1 is a schematic representation of a front elevational view in cross-section of a flue gas process chamber with two moving beds according to the present invention.

Referring to FIG. 1, a gas stream 1, preferably a flue gas stream, passes through a line 2 into an inlet duct 3 of a moving bed housing 4 filled with a granular carbon-bearing adsorption agent 5, preferably activated coke. While the activated coke 5 as dry, granular, fresh or regenerated, or partly spent material enters into the first housing 4 through a line 6, passes through a first moving bed 7 enclosed in the housing 4 and advancing downward in a vertical direction, and leaves the moving bed 7 through a line 8 on the lower part of the first housing 4, the flue gas 1 to be purified flows in a horizontal direction through the moving bed 7. On the outlet side of the first housing 4, a prepurified flue gas stream 9 comprising upper stream 9a, central stream 9b, and lower stream 9c, enters into an outlet duct 10. From this outlet duct 10, the prepurified flue gas stream is admitted through a line 11 into a process chamber 12 according to the invention.

While the flue gas stream 1 passes through the first moving bed 7, part of the undesired flue gas constituents is retained on the granular, carbon-bearing material, preferably activated coke. While, for example, hydrogen hydracid and $NO_2$, because of their low concentration, are not enriched to the limit load at the traveling speed, applied in practice, of the moving bed 7, this condition is attained for sulphur dioxide in the lower part of a moving bed 7 so that a substantial $SO_2$ breakthrough will occur. The NO contained in the unpurified flue gas stream 1 as the major portion of the total content of nitrogen oxides is virtually not retained by the first moving bed 7. It leaves the moving bed 7 together with the prepurified gas stream 9. Referring to the prepurified flue gas stream 9 or 9a, 9b, and 9c, the upper part stream 9a is practically free from $SO_2$. Depending on the mode of operation and on the initial concentration in the unpurified flue gas, the central part stream 9b contains up to 100 mg $SO_2/m^3$ NPT, and the lower part stream 9c contains up to 1500 mg $SO_2/m^3$ NPT. These part streams of different concentrations are now sent through the line 11 into the process chamber 12.

The part streams 9a, 9b, and 9c of the prepurified flue gas 9 are combined in a premixing duct 13 having guide baffles to form a stream 14 of prepurified flue gas of levelled $SO_2$ concentration. This stream 14 now enters into a conditioning duct 15 into which further gases, vapors or liquids, especially oxygen, air, oxygen-bearing gas mixtures and/or water or water vapor can be injected as a stream 16 through a line 17 with the aid of injection devices 18. A resulting prepurified, $SO_2$-leveled and conditioned flue gas stream 19 leaves the conditioning duct 15 and enters into a final mixing duct 20. This final mixing duct 20 may be an empty surge space. Preference is given, however, to providing guide baffles to achieve a static final mixing. The prepurified, conditioned flue gas with homogenized concentrations of constituents is present as a gas stream 21 having optimum characteristics for the $NO_x$-elimination step.

Downstream of the final mixing duct 20, the gas stream 21 leaves the process chamber 12 through a line 22 to enter into an inlet duct 23 of a second moving bed 24 of granular, carbon-bearing material, preferably activated coke. A stream of ammonia is injected into the inlet duct 23 through a line 33 provided with distributing nozzles or simple openings for being mixed with ammonia in a known way. The gas stream then penetrates into the second moving bed. This moving bed also travels in a vertical direction from top to bottom in a housing 25. Fresh and/or regenerated adsorption agent is fed to this moving bed 24 as a stream 27 through a line 26. A line 28 is provided for continuously withdrawing a stream 29 of spent adsorption agent which is transferred in a known way to the feed stream 5 of the first moving bed 7. The gas stream 21, mixed with ammonia, now passes in a horizontal direction across the vertically descending moving bed 24. On the outlet side of the moving bed 24, a purified gas 30 obtained from the gas stream 21 with an admixture of ammonia passes into an outlet duct 31 from where it is discharged through a line 32.

Figure 2:
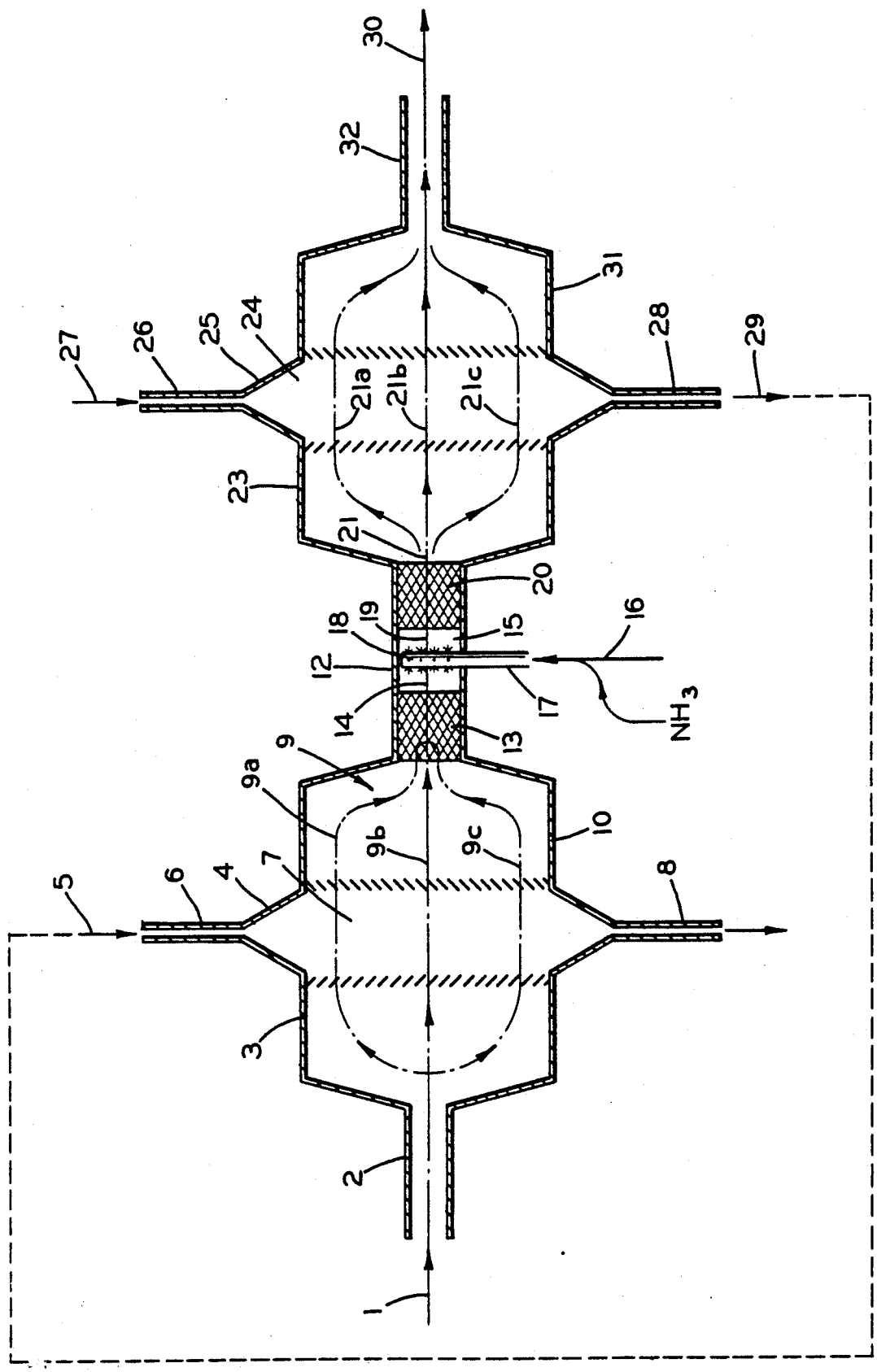
FIG. 2 is a schematic representation of a front elevational view in cross-section of a process chamber with two moving beds according to an alternate embodiment of the present invention.

Referring to FIG. 2, the plant-related embodiment of the invention permits omitting the lines 11 and 22 without deviating from the characteristic features of the invention. In this case, the prepurified flue gas 9 comprising part streams 9a, 9b, and 9c of different $SO_2$ concentrations passes from the outlet duct 10 of the first moving bed 7 directly into the process chamber 12. In the same way, the gas to be freed from $NO_x$ and obtained in the final mixing duct 20 of the process chamber 12 after addition of ammonia through the line 17 and the device 18 leaves the final mixing duct 20 to pass directly into the inlet chamber 23 of the second moving bed 24. Part streams 21a, 21b, and 21c of the gas mixed with ammonia and to be freed from $NO_x$ contain the same concentrations of the flue gas constituents.

The process according to the invention can be performed in plants of different configurations without deviating from the inventive idea. The process according to the invention may be described by way of example as follows:

EXAMPLE 1

Referring to the process and plant for the desulphurization of and $NO_x$-elimination from approximately 170,000 $m^3$ NPT/h of flue gas available at the battery limits at about 120° C. and containing about 4000 mg $/m^3$ NPT of $SO_2$ and 500 mg $/m^3$ NPT of $NO_x$, the unit may be assumed to ensure that approximately 90% of the sulphur dioxide entrained by the flue gas is retained in a first moving bed and that, after injection of ammonia into this prepurified flue gas, approximately 50% of the $NO_x$ contained in the flue gas is eliminated together with the residual $SO_2$ in a second moving bed so that desulphurization totals a figure in excess of 98%. The inlet surfaces of the two moving beds consisting of commercial activated coke have a size of about 260 $m^2$ each at a width of about 18.6 m and a height of about 14 m. Steady-state conditions are attained in the moving bed during operation of the plant. In their design service condition, the moving beds receive a transverse flow of flue gas. The outlet surface of the moving bed has the same size as the inlet surface. On the outlet side of the first moving bed, no measurable concentrations are found in the top quarter of the bed height. As opposed to this condition, the average local separation efficiency in the lower zone from zero to about 1.50 m is not more than approximately 67%.

Starting from the boundary conditions outlined before, the following Table shows process parameters relating to the performance of the inventive process and the corresponding process parameters for two configurations according to the state of the prior art. Configuration One corresponds to the process proposed in West German Patent DE-OS 2911712, FIG. 1. Configuration Two corresponds to a process published in West German Patent DE-OS 3232543, FIG. 3. The advantages of the inventive process concerning pressure drop, mechanical losses of adsorption agent and the occurrence of the ammonia breakthrough are readily visible. Configuration One, which provides for an accelerated circulation of adsorption agent to reduce the sulphur dioxide breakthrough to a point where conglomerations and incrustations in the second moving bed can be avoided, features a loss of adsorption agent that is almost twice as high as in the inventive process. Although, for the same pressure drop resulting from the same depth of the moving beds as that in the inventive process, approximately one third of the required ammonia flow which, however, is a small quantity in terms of its absolute figure, is actually saved, the mean ammonia breakthrough is 50% higher than in the inventive process. By increasing the depth of the second moving bed by about 0.5 m, this higher ammonia breakthrough could be lowered to the value of the inventive process, but the pressure drop across the plant would rise to about 115% of the pressure drop in the inventive process.

Referring to configuration Two, the mean ammonia breakthrough of the second moving bed is so strong that it must be withheld by a third moving bed of approximately 0.7 m thickness fed with spent granular, carbon-bearing material from the first moving bed and arranged on the gas side downstream of the second moving bed. For the same ammonia consumption, the pressure drop in this configuration rises to about 120% of the pressure drop in the inventive process. Moreover, the additional transport route to the third moving bed entails an additional loss of adsorption agent. This loss exceeds by about 10% the loss in the inventive process.

In addition, the process according to configuration Two incorporates the risk that the granular, carbon-bearing material might be subject to the formation of conglomerations or incrustations owing to the presence of large quantities of ammonium sulphate and ammonium bisulphate—approximately five times as much as in the inventive process—in the lower part of the second moving bed in the area near the inlet surface and also in the upper part of the third moving bed.

The adjustment of desired concentrations of reactants in the conditioning channel 15 of the process chamber 12 after the gas has left the first moving bed 7, which primarily serves for desulphurization, may be described by way of example, as follows:

EXAMPLE 2

At the battery limits of a desulphurization and $NO_x$-elimination unit according to the present invention, a low-oxygen flue gas from a furnace is received at approximately 120° C. This flue gas is substantially characterized by a content of about 23% by volume of water vapor, and about 1% ppm by volume of NO. After passage through the first moving bed and the premixing duct 13 of the process chamber 12, air (stream 16) is admixed to the predesulphurized and homogenized flue gas through the line 17 and the nozzle assembly 18 so that the oxygen content of the predesulphurized and homogenized flue gas 14 is approximately 5% by volume in the conditioned steam 19. To this predesulphurized, homogenized and conditioned flue gas stream 19, about 25 mg of ammonia per m³ NPT are added. The reaction mixture is subjected to another mixing step in the final mixing duct 20. The gas mixture stream 21 now passes through the second moving bed where the catalytic $NO_x$-elimination reaction takes place at temperatures of about 120° C. The analysis of the purified flue gas 30 shows an NO conversion of about 53%. Flue gas purification without conditioning with air will yield a maximum conversion of about 35% of the NO.

In accordance with the provisions of the patent statutes, the principles and mode of operation of the invention have been illustrated and described in what is considered to represent its preferred embodiment. However, it should be noted that the present invention may be practiced otherwise than as specifically illustrated and described without departing from its spirit and scope within the limitations of the appended claims.

What is claimed is:

1. A process for treating a flue gas stream, including the catalytic adsorption of sulfur compounds and the catalytic reduction of nitrogen oxides, in gravity-flow beds of granular carbon-bearing material by a transversely flowing stream of the flue gas, comprising the steps of:
   A) providing first and second moving beds of granular carbon-bearing material;
   B) passing the stream of flue gas through the first moving bed, transversely to the direction of movement of the first moving bed, thereby obtaining a plurality of part streams of partially desulfurized flue gas separated along an axis of movement of the first moving bed, the part streams having unequal residual sulfur dioxide concentrations;
   C) mixing the part streams together to form a stream of partially desulfurized flue gas having a homogeneous sulfur dioxide concentration;
   D) adding a conditioning agent to the partially desulfurized flue gas stream, in an amount sufficient to enhance the reduction of nitrogen oxides;
   E) adding ammonia to the partially desulfurized flue gas stream, to reduce nitrogen oxides;
   F) passing the partially desulfurized flue gas stream, containing the conditioning agent and ammonia, through the second moving bed, transversely to the direction of movement of the second moving bed, to further desulfurize the flue gas and reduce nitrogen oxides in the flue gas, thereby preparing a treated flue gas stream.

2. The process for treating a flue gas stream, according to claim 1, wherein the conditioning agent is selected from the group consisting of oxygen and air.

3. The process for treating a flue gas stream, according to claim 2, wherein the conditioning agent is air.

4. The process for treating a flue gas stream, according to claim 1, wherein steps D and E are performed simultaneously.

* * * * *